Figure 1:
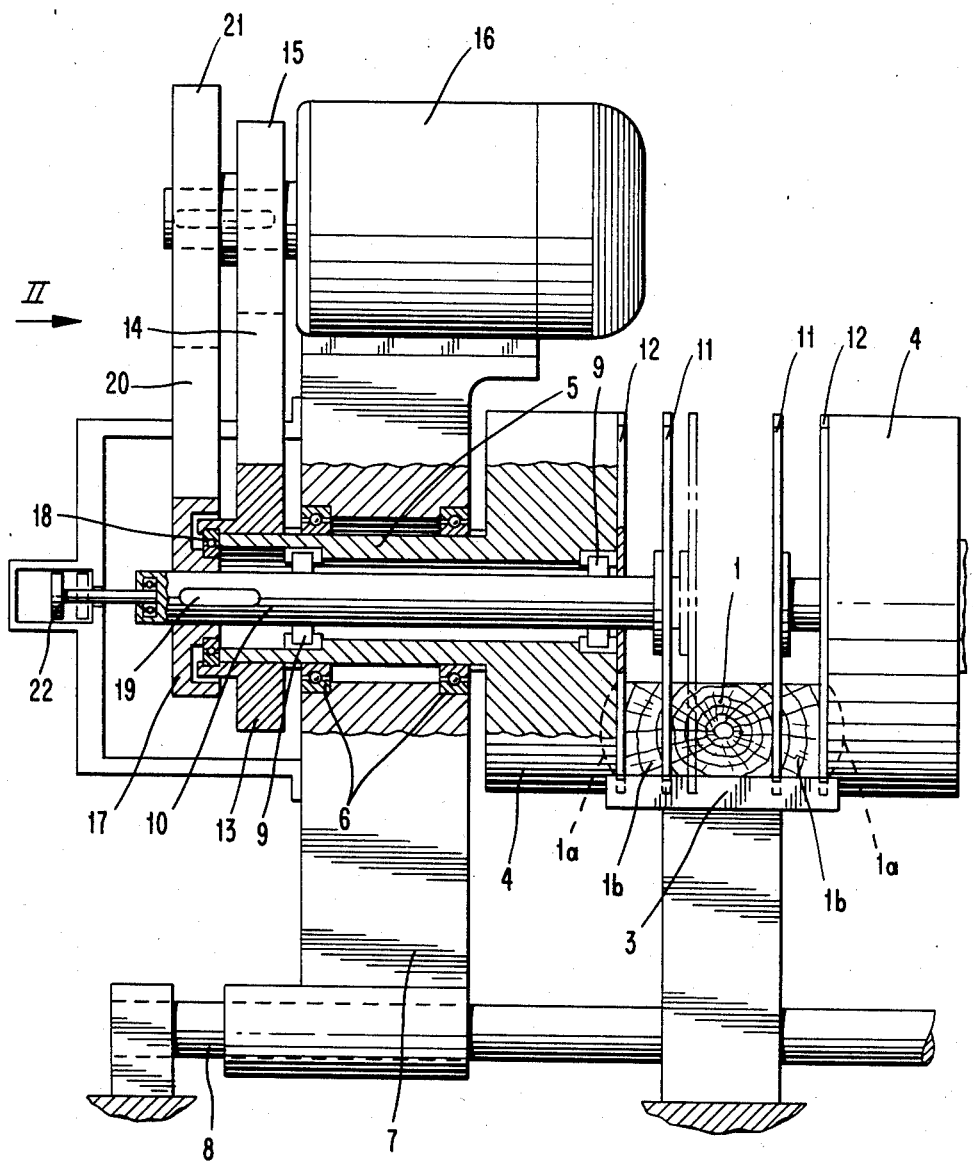

United States Patent [19]

Reuter

[11] Patent Number: 4,691,749
[45] Date of Patent: Sep. 8, 1987

[54] TREE-TRUNK SAWING AND CUTTING INSTALLATION

[75] Inventor: Alfred Reuter, Oberkirch, Fed. Rep. of Germany

[73] Assignee: Gebruder Linck Maschinenfabrik und Eisengiesserei "Gatterlinck", Oberkirch, Fed. Rep. of Germany

[21] Appl. No.: 822,418

[22] PCT Filed: Apr. 25, 1985

[86] PCT No.: PCT/EP85/00186
§ 371 Date: Dec. 30, 1985
§ 102(e) Date: Dec. 30, 1985

[87] PCT Pub. No.: WO85/05062
PCT Pub. Date: Nov. 21, 1985

[30] Foreign Application Priority Data

Apr. 28, 1984 [DE] Fed. Rep. of Germany ....... 3415931

[51] Int. Cl.⁴ .............................................. B27C 9/00
[52] U.S. Cl. ........................................ 144/39; 83/499; 83/425.4; 83/508.2; 83/504; 83/700; 144/373; 144/377
[58] Field of Search .............. 144/37, 39, 41, 3 R, 144/369, 370, 376, 377, 378; 83/425.2, 425.4, 499, 504, 508.2, 700

[56] References Cited

U.S. PATENT DOCUMENTS 3,630,244 12/1971 Cromeens .
3,630,513 12/1971 Davidson, Jr. et al. .
3,750,513 8/1973 Cromeens ............................ 83/499
4,335,767 6/1982 Reuter .
4,456,045 6/1984 Gregorie ............................. 144/39

FOREIGN PATENT DOCUMENTS 2010060 9/1970 Fed. Rep. of Germany .
2158912 7/1973 Fed. Rep. of Germany .
2166292 11/1973 Fed. Rep. of Germany .
3312033 6/1983 Fed. Rep. of Germany .
2455961 12/1980 France .
415012 7/1966 Switzerland .

Primary Examiner—W. D. Bray
Attorney, Agent, or Firm—Burns, Doane, Swecker & Mathis

[57] ABSTRACT

A log sawing and cutting apparatus has a knife head which serves as a cutting tool for the production of wood chips and a coaxial circular sawblade which serves to saw off at least one side board. The knife head is connected with a hollow shaft. The saw shaft is connected to a saw shaft and is pivoted and axially displaceably supported in the hollow shaft. The saw shaft is connected with a drive apparatus which provides a higher spped than the hollow shaft.

4 Claims, 2 Drawing Figures

TREE-TRUNK SAWING AND CUTTING INSTALLATION

BACKGROUND OF THE INVENTION

The invention relates to a sawing and cutting apparatus for logs, with at least one knife head which serves as a cutting tool for the production of wood chips and at least one circular sawblade connected with a saw shaft arranged coaxially and spaced thereto which serves to saw off at least one sideboard.

In the processing of round timber logs to lumber such as boards and square timber, it is known from the so-called profile-cutting method how to cut the exterior wood parts which would give slabs with knife heads to wood chips suitable, for example, for the production of chipboard or cellulose.

In a known apparatus of the initially described type (DE-OS 29 47 190), two opposite-lying knife heads and several intermediate-lying circular saw blades are arranged on a common shaft. The difficulty with this, however, is that the knife heads have to be driven at a relatively low rotational speed to produce wood chips of sufficient fiber length, whereas a sufficiently high rotational speed is required for driving the circular sawblade with respect to the required sawing quality. Both requirements can not be fulfilled simultaneously with the known apparatus, so that in general a too high rotational speed of the knife heads and with it an insufficient quality of the wood chips produced has to be put up with.

Furthermore, in the known apparatus the circular sawblades are arranged rigidly on the common drive shaft so that only boards or square timber of constant width can be produced. An adjustment to different desired dimensions is not possible or only through an expensive reconstruction of the apparatus.

It has already been known for a long time (DE-OS 20 10 060) how to carry out the sawing process for the production of the sideboard or sideboards simultaneously, but independent of the cutting process. In the known apparatus, belt saws or gang saws are used which also make possible an adjustment of the width. The feed rate of the logs must be chosen relatively low in this case, however, to accomodate the requirements of the sawblades, which in turn is disadvantageous for the cutting process.

The relatively high feed rate of the logs possible with the cutting tools for wood chip production, which is desirable for reasons of high work capacity, makes it necessary to carry out the sawing-off of the sideboard or sideboards, respectively, with rapidly running circular saws which are usually spaced at greater distances to the cutting tools in the feed direction of the logs, for example, double circular saws in pairs on top of each other, or displaced with respect to one another. In this arrangement, with a high feed rate, the rotational speeds of the knife heads and circular sawblades can be optimally chosen in each instance with a high feed rate of the logs, but the spatial separation of the knife heads and the circular sawblades causes unavoidable imprecisions, especially for the thickness of the sideboard to be sawed off. Only with expensive guide measures can it be assured that the surface of the sideboard sawed by the circular sawblades is sufficiently parallel to the plane surface produced beforehand by the knife head (DE-OS 29 18 622).

It is therefore the object of the invention to design a sawing and cutting apparatus of the initially described type in such a way that an adjustment to varying thicknesses of the sideboard to be sawed off is made possible at optimal speeds of the knife head and the circular sawblade in a straightforward manner.

This object is attained according to the invention by connecting the knife head with a hollow shaft, supporting the saw shaft rotatably and axially displaceable in the hollow shaft and connecting the saw shaft with a drive apparatus which delivers a higher rotational speed than the hollow shaft.

With the separate drive of the saw shaft with higher rotational speeds than the hollow shaft of the knife head, the respective optimal rotational speeds can be chosen for each of the two separate working processes, so that on the one hand wood chips with sufficiently large fiber length are produced at a high feed rate of the logs, and on the other hand a high work quality of the saw cutting is achieved. Because the cutting process which also delivers the outer plane surface is carried out simultaneously with the sawing process and in close spatial proximity thereto, it is assured that the two lateral faces of the sideboard produced in in this way and the thickness of the sideboard remain constant.

These conditions remain the same when the circular sawblades are adjusted to change the thickness of the sideboard which is made possible in a very simple way by axial displacement of the saw shaft in the hollow shaft.

If the application field of the apparatus according to the invention was stated before as the processing of logs, the processing of round timber logs on two opposite sides is to be understood hereunder, and also the processing of modules which were already flattened on two sides and then processed on sides lying opposite to one another.

It is known however (DE-OS 21 58 912) how to attach a knife head to a hollow shaft for profile cutting of the lateral face of a log in which a faster running saw shaft is supported which carries a circular sawblade. Herein, however, the circular sawblade is situated in the front side of the knife head and does not serve to saw off a sideboard, but only to smooth the surface produced by the knife head. An axial displacement of the circular sawblade is not provided for and would not make sense here.

Axially displaceable circular saws arranged on coaxial hollow shafts are known in different embodients (US-PS 3 630 244). These known apparatus only serve for the transverse adjustment of the circular sawblades, however; they do not have knife heads as cutting tools. The thus adjustable circular sawblades are driven by a common drive at the same rotational speed.

In an apparatus belonging to the not previously published state of the art (European Patent Application No. 01 06 907), several circular sawblades are also axially displaceably arranged. In this case, too, no equal-axis knife head is provided which cuts the outer log sections. All circular saws are driven at the same rotational speed.

In a further development of the invention, it is provided that the flight diameter of the circular sawblade is at most two times the wood chip length smaller than the flight diameter of the closest-lying cutting edges of the knife head. In this way, it is accomplished that at the end of a log the cutting process of the knife head is finished before the sawing process is finished.

In order to achieve a simple and especially compact construction, it is advantageously provided that the hollow shaft and the saw shaft are connected with a common drive motor via two gear trains with different transmission ratios.

On the front side of the knife head facing the circular sawblade another circular sawblade can be attached which smoothes the outer surface of the sideboard in a way known per se, and avoids roughness and fissures from the cutting process.

To process opposite sides of a log one knife head can be provided on each side of the log which has an axially adjustable circular sawblade. In order to make possible a quick and simple adjustment to different dimensions of the log, a carriage carrying the bearing of the hollow shaft can be guided in a machine frame and adjusted transversely with respect to the transportation direction.

THE DRAWINGS

The invention is explained in more detail with respect to an embodiment shown in the drawing.

Figure 2:
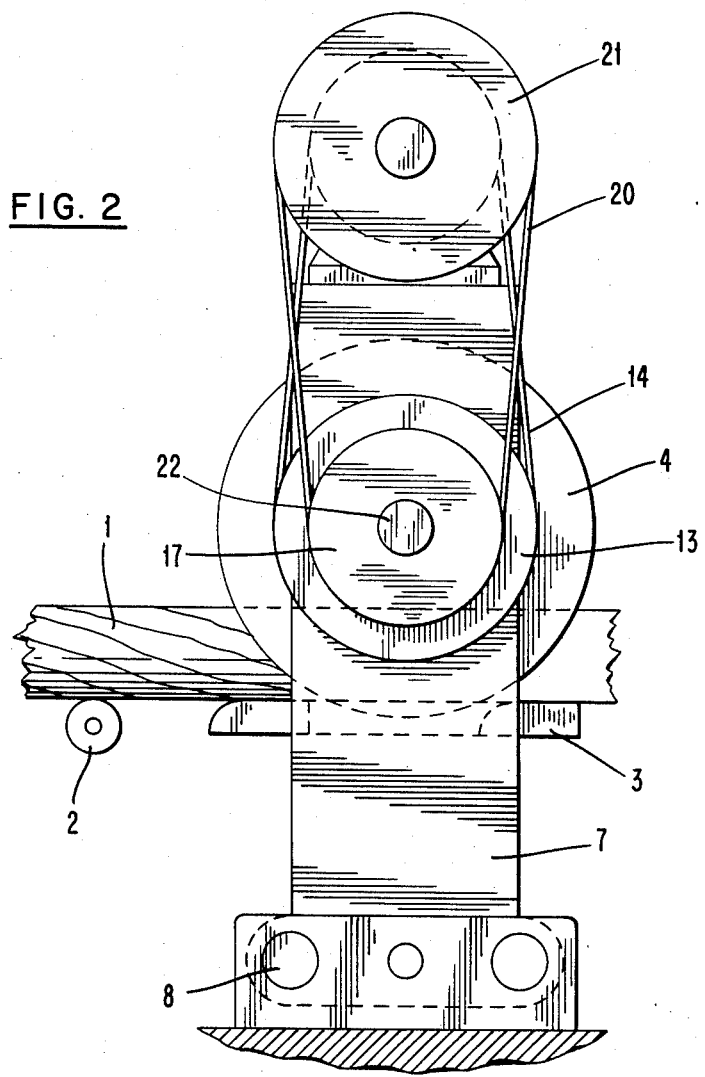

FIG. 1 shows a sawing and cutting apparatus for logs in a partial cross-section; and FIG. 2 is a lateral view in the direction of the arrow II in FIG. 1.

The sawing and cutting apparatus shown in the drawing serves in the embodiment shown to process the opposite sides of a module 1, the upper side and under side of which have already been flattened. The module 1 which is designated in general in the following as a log is guided by a feed and transportation apparatus of which only a transportation roller 2 is shown in FIG. 2 over a support 3. On both sides of the support 3, a knife head 4 equipped with chopping knives is arranged which serves to cut up the lateral parts 1a of the log 1 into wood chips.

The knife head 4 is supported on a hollow shaft 5 which is rotatably mounted in a carriage 7 by bearings 6. The sled 7 is displaceably guided on guideways 8 transversely to the transportation direction of the log 1.

In the hollow shaft 5 of a saw shaft 10 is rotatably mounted and axially displaceably supported on bearings 9. The saw shaft 10 carries a circular sawblade 11 on its free end which serves to saw off a sideboard 1b from the log 1. On the front side facing the circular sawblade 11 a further circular sawblade 12 is attached on the knife head 4 which serves to smooth the outer surface of the sideboard 1b.

At the end of the hollow shaft 5 a belt pulley 13 is attached which is connected by a belt drive 14 to a belt pulley 15 on the output shaft of a drive motor 16 which is supported by the carriage 7.

A belt pulley 17 with a diameter which is smaller than that of the belt pulley 13 is rotatably mounted at the back end of the hollow shaft 5 by a bearing 18 and forms a drive connection with the saw shaft 10 by means of a key 9, whereby however an axial relative movement is permitted. Axial movement of the saw shaft 10 is provided by a piston-and-cylinder unit 22. The belt pulley 17 is connected with a belt pulley 21 on the output shaft of the drive motor 16 by a belt drive 20. The diameter of the belt pulley 21 is larger than that of the belt pulley 15.

With the described choice of diameters of the belt pulleys 13, 15, 17 and 21, the saw shaft 10 is driven at a higher rotational speed than the hollow shaft 5 by the common drive motor 16. The saw shaft 10 receives a relatively high speed required for an optimal sawing process of the circular sawblade 11, whereas the knife head 4 is driven with the relatively low rotational speed which is optimal for the production of wood chips.

The drive and the adjustment of the circular sawblade 11 on the opposite side of the log 1 and of the knife head 4 is carried out in the same manner as described; the apparatus used herefor which was built in the manner described was therefore left out of FIG. 1.

In the embodiment shown, the flight diameter of the circular sawblade 11 is approximately equal to the flight diameter of the knife head 4 or the circular sawblade 12 attached to it, respectively.

I claim:

1. An apparatus for the cutting and sawing of logs, said apparatus comprising:
    a hollow shaft mounted for rotation about its longitudinal axis,
    a knife head carried by said hollow shaft and including a first circular saw blade for the production of wood chips from logs,
    a saw shaft extending coaxially through said hollow shaft and rotatable about its longitudinal axis relative to said hollow shaft, and linearly displaceable along its longitudinal axis relative to said hollow shaft, means for linearly displacing said saw shaft along its longitudinal axis,
    a second circular saw blade carried by said saw shaft so as to be axially spaced from said first circular saw blade for the production of sideboards from the logs, and
    drive means for rotating said hollow shaft and for rotating said saw shaft at a faster speed than said hollow shaft so that said second circular saw blade rotates faster than said first circular saw blade.

2. Apparatus according to claim 1, wherein said drive means comprises a drive motor and first and second drive transmitting means connecting said motor with said hollow shaft and said saw shaft, respectively, said first and second drive transmitting means defining different transmission ratios to rotate said saw shaft faster than said hollow shaft.

3. Apparatus according to claim 1 including log support means, said hollow shaft, knife head, saw shaft, second circular saw blade and drive means disposed on one side of said log support means, and further comprising an additional said hollow shaft, an additional said knife head, an additional said saw shaft, an additional said second circular saw blade, and an additional drive means disposed on the other side of said log support means.

4. Apparatus according to claim 1 including a carriage upon which said hollow shaft is rotatably mounted by means of bearings, said carriage together with said hollow shaft, being movable in the direction of said longitudinal axis of said hollow shaft.

* * * * *